United States Patent [19]
Akeel et al.

[11] Patent Number: 4,780,045
[45] Date of Patent: Oct. 25, 1988

[54] ROBOT WITH IMPROVED CABLE ROUTING SYSTEM

[75] Inventors: Hadi A. Akeel, Rochester Hills; Donald S. Bartlett, Troy; William H. Poynter, Jr., Mount Clemens, all of Mich.

[73] Assignee: GMF Robotics Corporation, Auburn Hills, Mich.

[21] Appl. No.: 117,988

[22] Filed: Nov. 9, 1987

[51] Int. Cl.⁴ ............................................. B66C 23/00
[52] U.S. Cl. ................................... 414/680; 414/918; 414/744 R; 901/15; 901/28; 901/50; 248/52; 248/68.1; 248/544; 182/65; 182/2
[58] Field of Search ................. 414/680, 918, 744 R; 901/15, 28, 50; 248/52, 68.1, 544; 182/63, 64, 65, 2

[56] References Cited

U.S. PATENT DOCUMENTS

| | | | |
|---|---|---|---|
| 180,223 | 7/1876 | Grinnell | 212/201 |
| 2,517,085 | 8/1950 | Cirillo | 212/252 X |
| 2,754,087 | 7/1956 | Johnson | 182/2 X |
| 3,163,880 | 1/1965 | Johnson | 182/2 X |
| 3,776,403 | 12/1973 | Billings | 414/918 X |
| 4,218,166 | 8/1980 | Abu-Akeel et al. | 414/918 X |
| 4,378,959 | 4/1983 | Susnjara | 414/732 |
| 4,625,936 | 12/1986 | Hadden, Sr. | 248/544 |
| 4,632,632 | 12/1986 | Simone | 901/50 X |
| 4,643,379 | 2/1987 | Potocnik | 248/68.1 |
| 4,659,279 | 4/1987 | Akeel et al. | 414/680 |
| 4,705,243 | 11/1987 | Hartmann et al. | 901/15 X |
| 4,715,571 | 12/1987 | Soltow et al. | 248/68.1 |

FOREIGN PATENT DOCUMENTS

| | | | |
|---|---|---|---|
| 156188 | 8/1952 | Australia | 212/251 |
| 57-89707 | 12/1983 | Japan | 901/50 |
| 8700256 | 1/1987 | PCT Int'l Appl. | 248/68.1 |
| 306927 | 4/1955 | Switzerland | 212/240 |
| 0827369 | 5/1981 | U.S.S.R. | 212/252 |
| 1106953 | 8/1984 | U.S.S.R. | 248/68.1 |

*Primary Examiner*—Robert J. Spar
*Assistant Examiner*—Jennifer L. Doyle
*Attorney, Agent, or Firm*—Brooks & Kushman

[57] ABSTRACT

In a robot including a first robot part which pivots with respect to a second robot part about a pivotal axis, a cable routing system includes a multitude of flexible cables which are retained at spaced apart positions by first and second retainers so that the cables are spaced around the outside of a cylinder whose axis coincides with the pivotal axis. A first connector mechanism connects that first retainer to the first robot part so that the first retainer rotates with the first robot part about the pivotal axis during pivoting. A second connector mechanism connects the second retainer to the second robot part so that the second retainer is movable axially toward the first retainer against the biasing action of a spring along the pivotal axis and prevented from rotating about the pivotal axis during pivoting. Each of the retainers includes a slotted disk which separates and guides the cables. The system takes up relatively little space inside the robot, yet guides the cables so that they do not rub against each other or any other robot part. Also, the system places very little bending and twisting stresses on the cables. Consequently, cable life is extended.

12 Claims, 4 Drawing Sheets

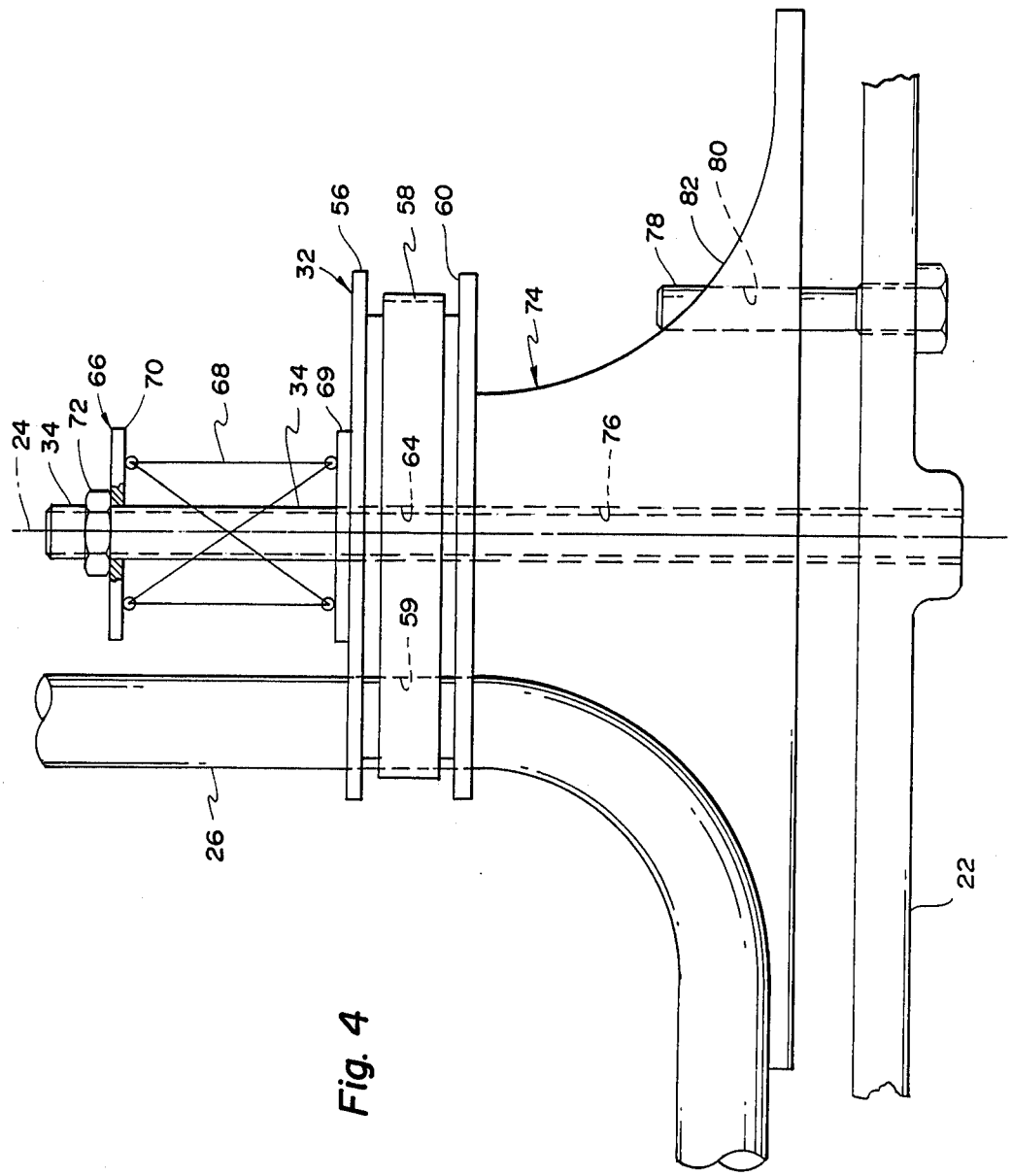

ROBOT WITH IMPROVED CABLE ROUTING SYSTEM

TECHNICAL FIELD

This invention relates to robots having pivotal parts and, in particular, to such robots having internally routed cables.

BACKGROUND ART

The prior art discloses various methods of routing and clamping the cables in a robot including electrical cables and/or cables containing a fluid, such as paint. When such cables are connected to robot parts which are rotatable about a pivotal axis, the cable must be routed and/or clamped to prevent interference or rubbing between the cables and between the cables and other internal robot parts.

One method that has been used is to position the cable or cables so that the cables wind or unwind depending on the direction of rotation. This method however, requires additional space to allow the winding and unwinding of the cables. If such space is not provided, the coils of the cable will rub against the other moving and non-moving parts of the robot, thereby shortening the life of the cables. Also, such cables must be very flexible to permit such winding and unwinding.

Another method that has been employed is the method described in U.S. Pat. No. 4,659,279 assigned to the Assignee of the present application. This method includes a ribbon of cables which are connected to and extend between first and second robot parts which are relatively pivotable. The cables do not rub against each other and the effective lengths of the cables do not change during pivoting. This construction minimizes cable interference with other parts of the robot and provides a compact construction. This construction also minimizes the amount of bending that the robot cables experience and also increases the projected lifetime of the cables. Other prior art methods and systems are disclosed in the Background Art section of the above-noted patent and also by the references cited during the prosecution of the above-noted patent.

DISCLOSURE OF THE INVENTION

An object of the present invention is to provide an improved cable routing system in a robot including at least one cable which extends between and is connected between first and second robot parts which are relatively pivotable and which cable takes up a minimal amount of space within the robot.

Another object of the present invention is to provide an improved cable routing system in a robot including a multitude of cables connected to and extending between relatively pivotable first and second robot parts, wherein the cables do not rub against each other nor against any internal components of the robot, thereby greatly extending the useful life of the cables.

Yet still another object of the present invention is to provide an improved cable routing system in a robot including a multitude of cables which is connected to and extends between relatively pivotable first and second robot parts, wherein the system is relatively inexpensive and wherein twisting stresses on the cables are small, thereby preventing premature cable failure due to fatigue stresses.

In carrying out the above objects and other objects of the present invention, a robot constructed in accordance with the present invention includes a base and an arm assembly supported on the base. The robot includes first and second robot parts. The first robot part is pivotable about a pivotal axis relative to the second robot part. The robot also includes at least one flexible cable, a first retainer for receiving and fixedly retaining a first portion of the cable, and a first connecting means for fixedly connecting the first retainer to the first robot part so that the first retainer rotates with the first robot part about the pivotal axis during pivoting. A second retainer receives and fixedly retains a second portion of the cable and a second connecting means connects the second retainer to the second robot part so that the second retainer is movable axially along the pivotal axis during pivoting. The cable extends in a direction substantially parallel to the pivotal axis in a substantially unflexed condition of the cable so that the cable flexes a limited amount during said pivoting.

Preferably, a plurality of flexible cables are connected to the first and second robot parts at spaced locations to provide a ring of cables that does not rub against each other during the pivoting and which cables form a cylinder whose axis substantially coincides with the pivotal axis.

The above construction minimizes cable interference with other pats of the robot, as well as with each other while, at the same time, providing a compact construction. The above construction also minimizes the amount of bending that the cables experience and also increases the projected lifetime of the cables.

The cable routing system is also relatively inexpensive since all of the complex details can be made from injection molded plastic and there is no high precision machining required. Also, there are no large structural pieces so that no special weldments or castings are required to utilize the invention.

Other advantages of the present invention will be readily appreciated as the same becomes better understood by reference to the following detailed description when considered in connection with the accompanying drawings.

BRIEF DESCRIPTION OF THE DRAWINGS

FIG. 4 is a side-elevational view, partially broken away, of a bottom retainer mechanism of the present invention.

BEST MODE FOR CARRYING OUT THE INVENTION

Figure 1:
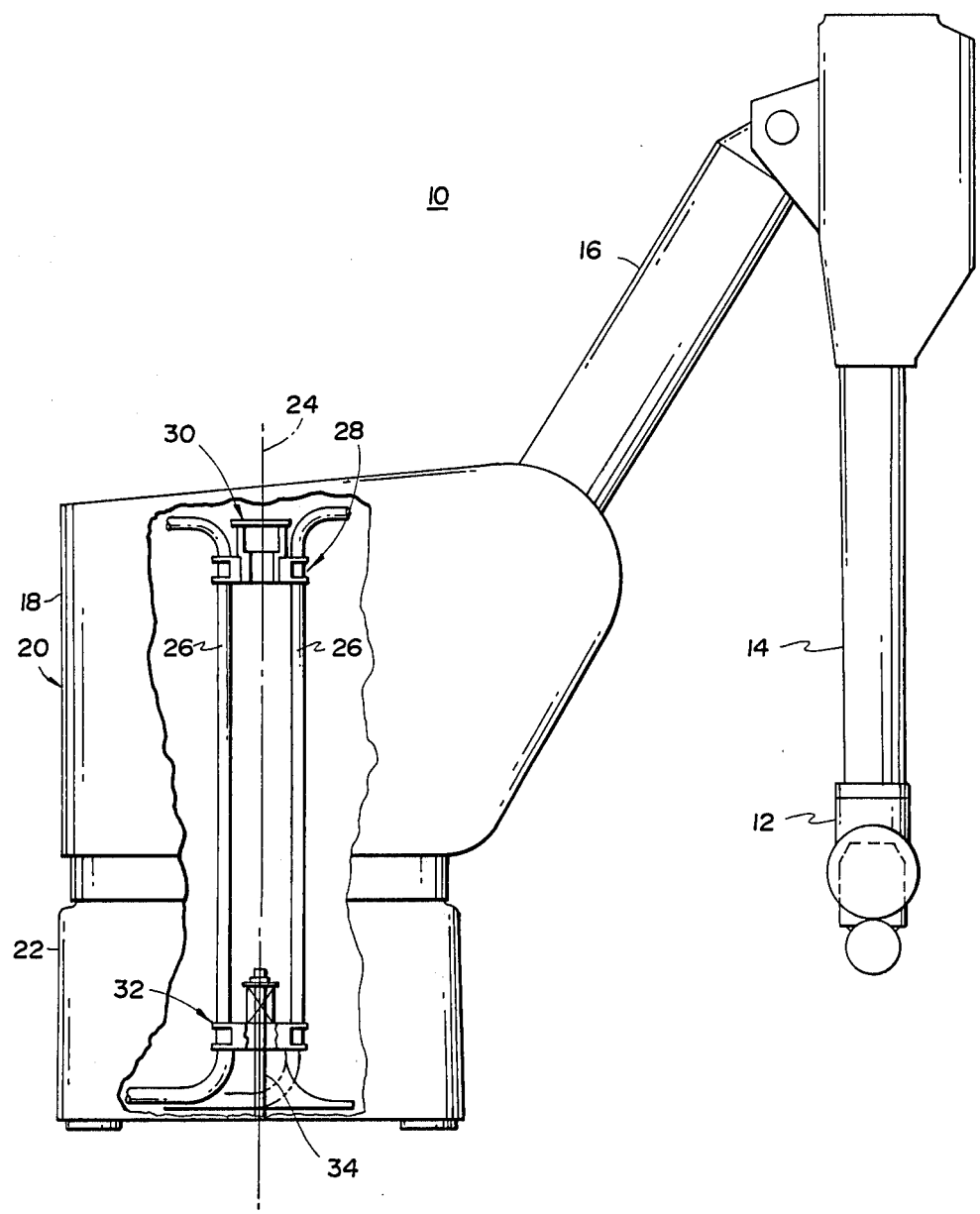
FIG. 1 is a partially broken away, side elevational view of a robot and cable routing system constructed in accordance with the present invention.

Referring now to FIG. 1 of the drawings, a robot constructed in accordance with the present invention is collectively indicated by reference numeral 10. The robot 10 preferably comprises a robot having three degrees of freedom constituted by rotary joints. A wrist mechanism 12 may be secured at the free end of an outer arm 14 of the robot 10 to provide additional degrees of freedom.

The outer arm 14 is pivotally connected to an inner arm 16 which, in turn, is pivotally connected to an upper rotatable section or turret casting 18 of a base, generally indicated at 20. The base 20 also includes a lower non-rotatable section or pedestal casting 22 fixedly attached to a floor or other support surface. The turret casting 18 rotates with respect to the pedestal casting 22 about a pivotal axis 24. As is well known, through appropriate gearing, motors (not shown) can controllably drive the turret casting 18, the outer and inner arms 14 and 16 and the different parts of the wrist mechanism 12.

At least one cable and, preferably a plurality of cables 26 extend upwardly from the pedestal casting 22 and into the turret casting 18 before being further distributed to other parts of the robot 10, such as to electric motors (not shown). Each of the cables 26 typically houses one or more smaller cables which, in turn, carry wires for carrying power signals or control signals for a particular electric motor, such as a conventional DC motor. For a given number of conductors, having a multitude of cables 26 allows the cables 26 to be smaller than having one large cable. This lowers the bending and twisting stresses on the cables 26 and gives them extended life. It also makes the cable routing system more flexible, thereby requiring less torque to rotate. In the preferred embodiment there are seven cables 26.

A top retainer mechanism, generally indicated at 28 receives and retains the cables 26. The top retainer mechanism 28 is fixedly attached and rotates with the turret casting 18 about the pivotal axis 24 by a first connector mechanism, generally indicated at 30.

A bottom retainer mechanism, generally indicated at 32, receives and retains the cables 26 within the pedestal casting 22. The bottom retainer mechanism 32 is slidably supported on an elongated center post 34 which is fixedly secured at the bottom end thereof at the bottom part of the pedestal casting 22 to extend along the pivotal axis 24.

The cables 26 are fixedly attached to both the top and bottom retainer mechanisms 28 and 32, respectively, which, in turn, support and guide the cables 26 as the turret casting 18 rotates. Preferably, the top and bottom retainer mechanisms 28 and 32, respectively, should be spaced apart as far as possible to thereby reduce the twist per unit length of the cables 26 and to, thereby, reduce the twisting stresses on the cables 26.

Figure 2:
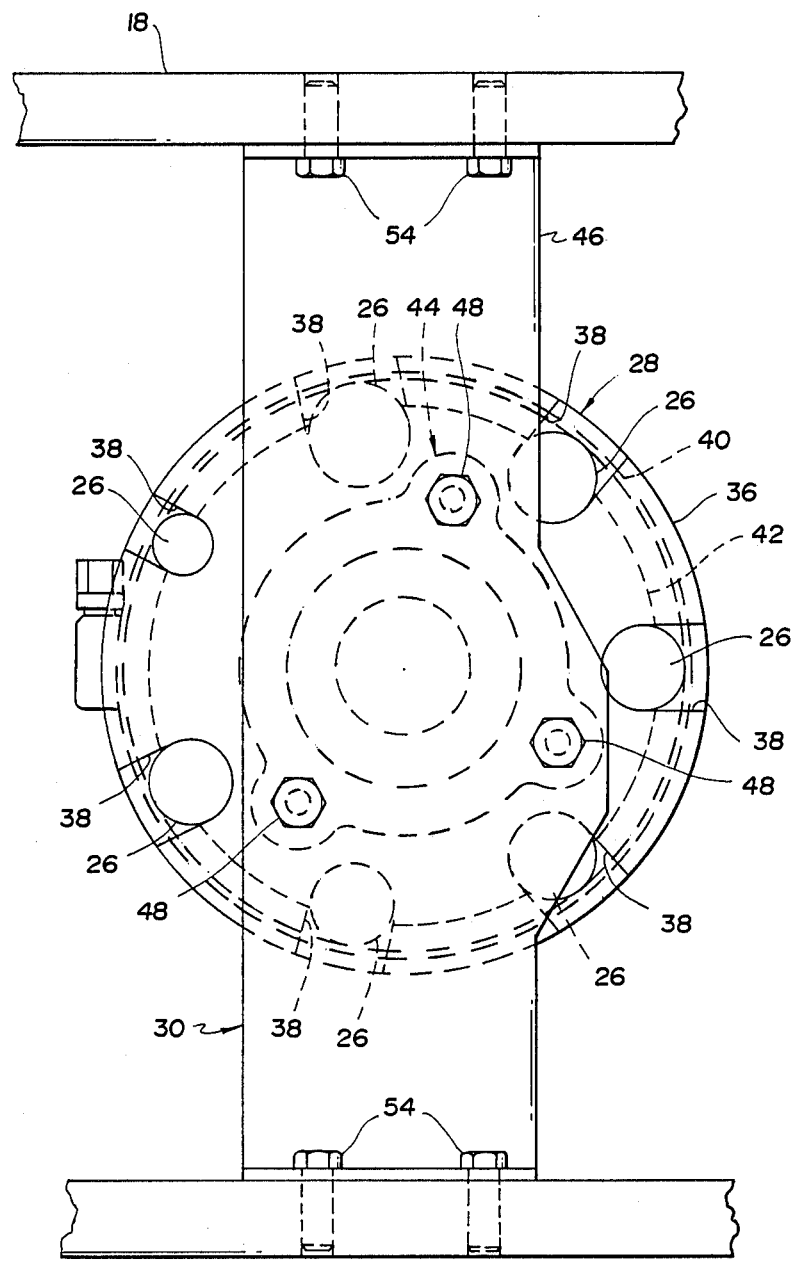
FIG. 2 is a top plan view, partially broken away, of a top retainer mechanism of the present invention.
Figure 3:
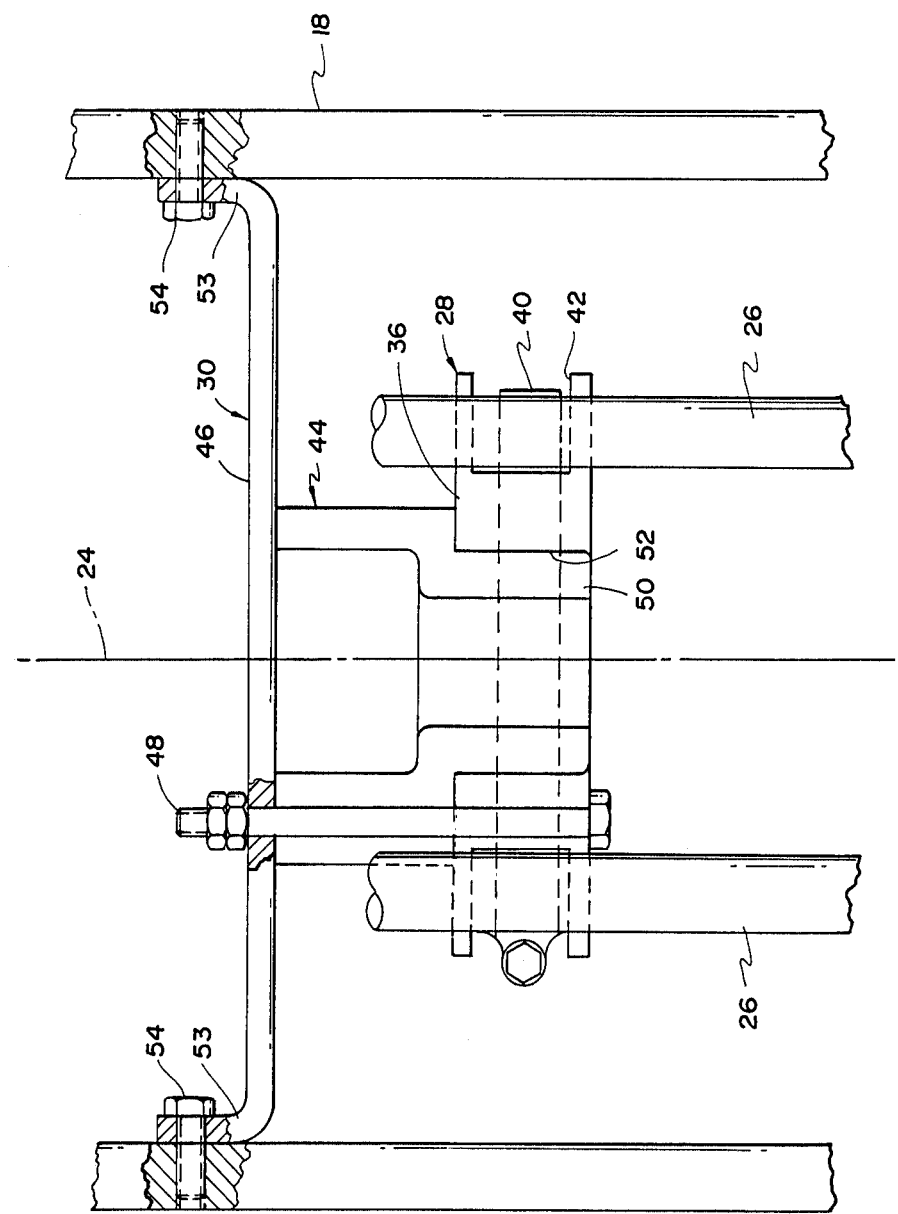
FIG. 3 is a side elevational view, partially broken away, of the top retainer mechanism.

Referring now to FIGS. 2 and 3, the top retainer mechanism 28 includes a slotted disc 36. Preferably, the slotted disc 36 comprises a round, injection molded, plastic detail having elongated radially extending slots 38 into which the cables 26 snugly fit.

The retainer mechanism 28 also includes an annular band member 40. Preferably, the band member 40 comprises a standard hose clamp which fits into a circumferential groove 42 formed in the disc 36. The circumferential groove 42 captures the band 40 and doesn't allow the band 40 to slip off the disc 36. The depth of the groove 42 is such that when the band 40 wraps around the contacts the cables 26 there is still space between the band 40 and the inner surface of the groove 42, as best shown in FIG. 2. This ensures that the band 40 has adequate room to clamp down and secure the cables 26 within their respective slots 38.

The disc 36 is fixedly attached to the turret casting 18 by a first connector means or mechanism 30 which includes a standoff, generally indicated at 44. The standoff 44 is fixedly connected to a mounting plate 46 by nut and bolt assemblies, only one of which is shown at 48. The nut and bolt assemblies 48 also fixedly secure the standoff 44 to the disc 36. The standoff 44 includes a collar portion 50 which fits within a central opening 52 formed completely through the disc 36. The mounting plate 46 is attached to the walls of the turret casting 18 at its flanges 53 by bolts 54.

Referring now to FIG. 4, there is illustrated in detail the bottom retainer mechanism 32 which includes a slotted disc 56 substantially identical to the slotted disc 36. The cables 26 are held by the disc 56 in the same way that the cables 26 are held by the top disc 36. That is, a band 58 holds the cables 36 within slots 59 formed in the disc 56 and within a groove 60.

The disc 56 is slidably received and retained on the threaded post 34. The post 34 extends through an aperture 64 which extends through the disc 56. The disc 56 is allowed to move axially upwardly along the pivotal axis 24 on the post 34 in response to an upward pulling force on the cables 26 when the top retainer mechanism 28 is rotated about the pivotal axis 24. In the absence of such axial movement, a substantial amount of tension would be created in the cables 26, thereby reducing their life. Preferably, the post 34 comprises a length of threaded rod which is fixedly secured to the bottom portion of the pedestal casting 22 with threads and thread-lock adhesive.

A biasing means or mechanism, generally indicated at 66, maintains the cables 26 under a relatively small amount of tension so that the cables 26 are not allowed to go slack in their unflexed condition. The small amount of tension provides maximum control of the cables 26 and keeps the cables 26 confined to a relatively small cylindrical space in the robot 10.

The biasing mechanism 66 includes a spring 68 which is positioned over the post 34 between a top washer 70 and a bottom washer 69. A nut 72 is threadedly secured to the post 34 and holds the washer 70 against the biasing action of the spring 68. In this way, the spring 68 pushes down on the disc 56 to tension the cables 26. Preferably, the spring 68 is a helical compression spring which exerts approximately 10 to 15 pounds of force to the top surface of the disc 56.

A cable bender, generally indicated at 74, is fixedly connected to the disc 56, such as by bolts (not shown) to redirect the cables 26 from a generally horizontal direction to vertical directions which are parallel to the pivotal axis 24. The cable bender 74 is also slidably received and retained on the post 34 via a centrally extending aperture 76 extending completely therethrough. The cable bender 74 provides a mechanism for the cables 26 to bend without pushing the disc 56 upward. In the absence of such a cable bender 74, the cables 26 would have a tendency to spring back to push the disc 56 upwardly, thereby removing tension from the cables 26.

The cable bender 74 as well as its fixedly attached disc 56 are prevented form rotating about the pivotal axis 24 by an anti-rotation rod 78 which is slidably received and retained within a hole 80 extending completely through a curved, integrally formed, annular portion 82 of the cable bender 74. Preferably, the anti-rotation rod 78 is a bolt with most of its threads removed. The rod 78 is also threadedly secured within the floor portion of the pedestal casting 22.

The particular construction of the cable routing system provides numerous advantages over the prior art. For example, rubbing between the cables 26 as well as rubbing between the cables 26 and other relatively stationary and moving parts of the robot 10 are substantially eliminated. Furthermore, the relatively limited flexing of the cables 26 does not require that the cables 26 exhibit an extreme amount of flexibility required when such cables are alternately wound and unwound from a coil.

Also, the cable routing system takes up minimal space and all flexing of the cables 26 takes place within a cylindrical space having a relatively large height compared to its diameter. Furthermore, since the distance between the attachment points between the turret casting 18 and the pedestal casting 22 is relatively long, the twist per unit length of cable is small, so that the twisting stresses on the cables 26 are also small. This prevents premature cable failure due to fatigue stresses, thereby allowing long cable life.

Also, the cable routing system is relatively inexpensive since no high precision machining is involved and many of the parts can be injection molded. No large structural pieces, such as special weldments or castings, are required.

The invention has been described in an illustrative manner and, it is to be understood that, the terminology which has been used is intended to be in the nature of words of description, rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. In a robot comprising a base and an arm assembly supported on the base, the improvement comprising:
    first and second robot parts, the first robot part being pivotable about a pivotal axis relative to the first robot part;
    at least one flexible cable;
    a first retainer for receiving and fixedly retaining a first portion of the cable;
    first connecting means for fixedly connecting the first retainer to the first robot part so that the first retainer rotates with the first robot part about the pivotal axis during said pivoting;
    a second retainer spaced apart from said first retainer for receiving and fixedly retaining a second portion of the cable; and
    second connecting means for connecting the second retainer to the second robot part so that the second retainer is movable axially along the pivotal axis during said pivoting, said cable extending in a direction substantially parallel to said pivotal axis in a substantially unflexed condition of said cable whereby said cable flexes a limited amount during said pivoting.

2. In a robot comprising a base and an arm assembly supported on the base, the improvement comprising:
    first and second robot parts, the first robot part being pivotable about a pivotal axis relative to the second robot part;
    a plurality of flexible cables;
    a first retainer for receiving and fixedly retaining first portions of the cables at spaced locations about the pivotal axis;
    first connecting means for fixedly connecting the first retainer to the first robot part so that the first retainer rotates with the first robot part about the pivotal axis during said pivoting;
    a second retainer spaced apart from said first retainer for receiving and fixedly retaining second portions of the cables at spaced locations about the pivotal axis; and
    second connecting means for connecting the second retainer to the second robot part so that the second retainer is movable axially along the pivotal axis during said pivoting, said cables extending in directions substantially parallel to said pivotal axis in a substantially unflexed condition of said cables, said first and second retainers retaining said cables at said spaced locations to provide a ribbon of cables that do not rub against each other during said pivoting whereby said cables flex a limited amount during said pivoting.

3. The robot as claimed in claim 2 wherein each of said first and second parts has a compartment for housing the cables.

4. The robot as claimed in claim 3 including biasing means for biasing the second retainer in a direction away from the first retainer.

5. The robot as claimed in claim 2 further comprising a cable bender fixedly mounted to said second retainer to move axially therewith along the pivotal axis for bending the cables so that the cables extend in the directions substantially parallel to the pivotal axis.

6. The robot as claimed in claim 4 further comprising guide means located in the compartment of the second robot part for guiding the axial movement of said second retainer against the biasing action of the biasing means.

7. The robot as claimed in claim 6 wherein said guide means includes a post fixedly mounted to the second robot part wherein said second retainer is slidably mounted on said post to move along the pivotal axis and wherein said biasing means includes a spring connected to said post to bias the second retainer.

8. The robot as claimed in claim 3 or claim 6 further comprising means located in the second compartment of the robot for preventing rotational movement of the second retainer about the pivotal axis during said pivoting.

9. The robot as claimed in claim 8 wherein said means for preventing includes a cable bender fixedly mounted to the second robot part, the cable bender slidably received and retained on the post.

10. The robot as claimed in claim 2 wherein at least one of said retainers includes a circular disk having an outer peripheral surface and a plurality of circumferentially spaced slots extending radially inwardly from the peripheral surface, said slots separating the cables to prevent rubbing therebetween.

11. The robot as claimed in claim 10 wherein said one retainer includes an annular band for clamping the cables to the one disk.

12. The robot as claimed in claim 3 wherein the first retainer is located in the compartment of the first robot part and the second retainer is located in the compartment of the second robot part.

* * * * *